US005230096A

United States Patent [19]

Davies et al.

[11] Patent Number: 5,230,096

[45] Date of Patent: Jul. 20, 1993

[54] RADIO RECEIVER ANTENNA ARRANGEMENTS

[75] Inventors: John Davies, Cheshire; Kenneth Duffy, Essex; Imtiaz Zafar, Lancashire, all of England

[73] Assignee: The General Electric Company, p.l.c., England

[21] Appl. No.: 668,071

[22] Filed: Mar. 12, 1991

[30] Foreign Application Priority Data

Mar. 14, 1990 [GB] United Kingdom ................ 9005779

[51] Int. Cl.[5] ........................ H04B 1/16

[52] U.S. Cl. ........................ 455/217; 455/287; 455/291

[58] Field of Search ............... 455/217, 280, 281, 287, 455/289, 291, 345

[56] References Cited

U.S. PATENT DOCUMENTS 3,992,669 11/1976 Dades .
4,703,328 10/1987 Jones et al. ........................ 343/713
4,791,421 12/1988 Morse et al. ........................ 342/368

FOREIGN PATENT DOCUMENTS 0055189 6/1982 European Pat. Off. .
0132382 1/1985 European Pat. Off. .
502511 4/1976 U.S.S.R. ............................ 455/217
1108070 4/1968 United Kingdom .

*Primary Examiner*—Reinhard J. Eisenzopf
*Assistant Examiner*—Almaz Woldu
*Attorney, Agent, or Firm*—Kirschstein, Ottinger, Israel & Schiffmiller

[57] ABSTRACT

A radio receiver antenna arrangement incorporating an RF pre-amplifier (5) wherein circuitry (11 to 21) is provided for by-passing the pre-amplifier when strong signals are picked up by the antenna (1) to avoid overloading the pre-amplifier.

3 Claims, 2 Drawing Sheets

RADIO RECEIVER ANTENNA ARRANGEMENTS

BACKGROUND OF THE INVENTION

This invention relates to radio receiver antenna arrangements.

More particularly the invention relates to radio receiver antenna arrangements of the kind comprising a radio antenna and a radio frequency (r.f.) amplifier associated therewith for amplifying signals picked up by the antenna prior to their application to a radio receiver. In such an arrangement the amplifier, which is typically referred to as a pre-amplifier, is normally preset to operate at all frequencies within a desired fixed bandwidth, which may be quite broad.

One difficulty experienced with such antenna arrangements is that in areas of intense r.f. field strength, i.e. near a transmitter, the amplifier may be overloaded and/or produce intermodulation products and/or may cause overload effects in the receiver.

SUMMARY OF THE INVENTION

It is an object of the present invention to provide an antenna arrangement wherein this difficulty is overcome.

According to the present invention there is provided a radio receiver antenna arrangement comprising: a radio antenna; a radio frequency amplifier for amplifying signals picked up by the antenna prior to their application to a radio receiver; and bypass circuit means associated with said amplifier which establishes a bypass path around said amplifier when the signals picked up by said antenna exceed a predetermined level.

BRIEF DESCRIPTION OF THE DRAWINGS

One antenna arrangement in accordance with the invention will now be described, by way of example, with reference to the accompanying drawings in which.

DETAILED DESCRIPTION OF THE PREFERRED EMBODIMENT

The antenna arrangement is for use in a vehicle and makes use of the rear window electric resistance heater of the vehicle as an antenna, as described for example in U.S. Pat. No. 4,086,594.

Figure 1:
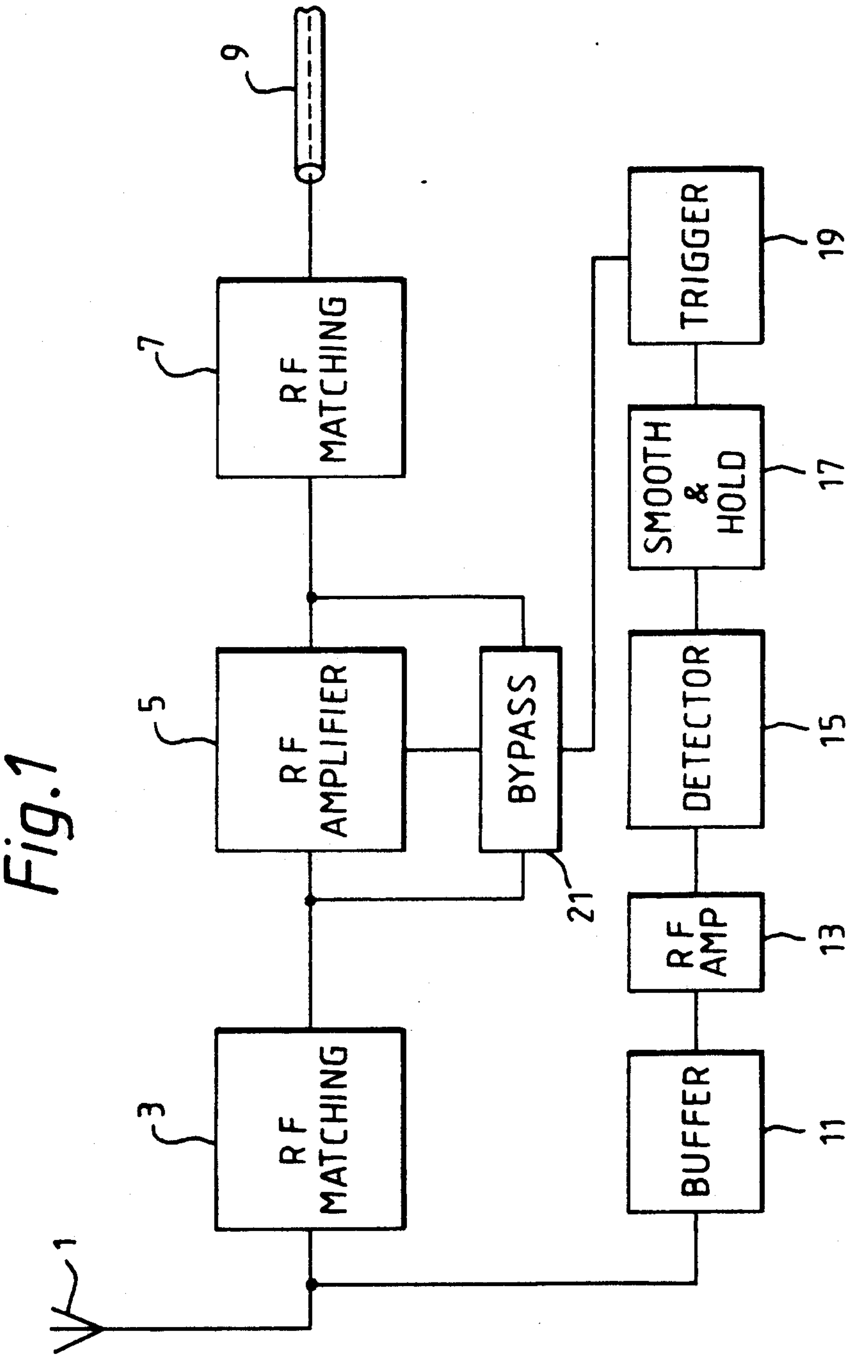
FIG. 1 is a block schematic diagram of the arrangement.

Referring to FIG. 1, the antenna 1 is connected by way of r.f. matching circuits 3 to the input of a broad, fixed bandwidth r.f. amplifier 5. The output of the amplifier 5 is connected via further matching circuits 7 to one end of a coaxial cable 9 whose other end is connected to the antenna terminal (not shown) of a radio receiver (not shown).

The antenna 1 is further connected by way of a buffer circuit 11 to a high gain second r.f. amplifier 13. A direct current (d.c.) voltage proportional to the amplitude of the output of the amplifier 13 is produced by a rectifying detector 15. The output of the detector 15 is smoothed and the smoothed output temporarily held in a smooth and hold circuit 17.

The output of the hold circuit 17 is applied to a suitable trigger circuit 19, e.g. a Schmitt trigger circuit, which controls the condition of a bypass circuit 21 connected between the input and output of the amplifier 5.

It will be appreciated that the components 3 to 7 and 11 to 21 are normally all housed in an enclosure (not shown) near the antenna 1 at the rear of the vehicle whilst the receiver is located at the front of the vehicle.

In operation, when the amplitude of the r.f. signal picked up by the antenna 1 exceeds a predetermined level just below that at which the amplifier 5 tends to produce an output containing intermodulation products or which may overload an input stage of the receiver, the d.c. output of the detector 15 exceeds a reference voltage applied to the trigger circuit 19. The trigger circuit 19 consequently operates to apply a control voltage to the bypass circuit 21. In consequence, the circuit 21 establishes a bypass path around the amplifier 5 between the matching circuits 3 and 7, and thereby effectively removes the amplifier 5 from the antenna arrangement, when the signal picked up by the antenna 1 exceeds the predetermined level. The possibility of the amplifier 5 producing overload effects in the receiver when the antenna arrangement is in an area of intense r.f. field is thus avoided.

The buffer circuit 11, which is suitably of the resistive type, prevents the presence of the high gain amplifier 13 unduly loading the matching circuits 3, and also prevents intermodulation products which may be produced in the high gain amplifier 13, from reaching the receiver via the bypass circuit 21.

The detector 15 and hold circuit 17 are conveniently of the diode and capacitor type found in conventional radio receiver automatic gain control arrangements.

The bypass circuit 21 typically incorporates a controllable switching device such as a semiconductor diode, transistor or electromagnetic relay.

Figures 2A, 2B:
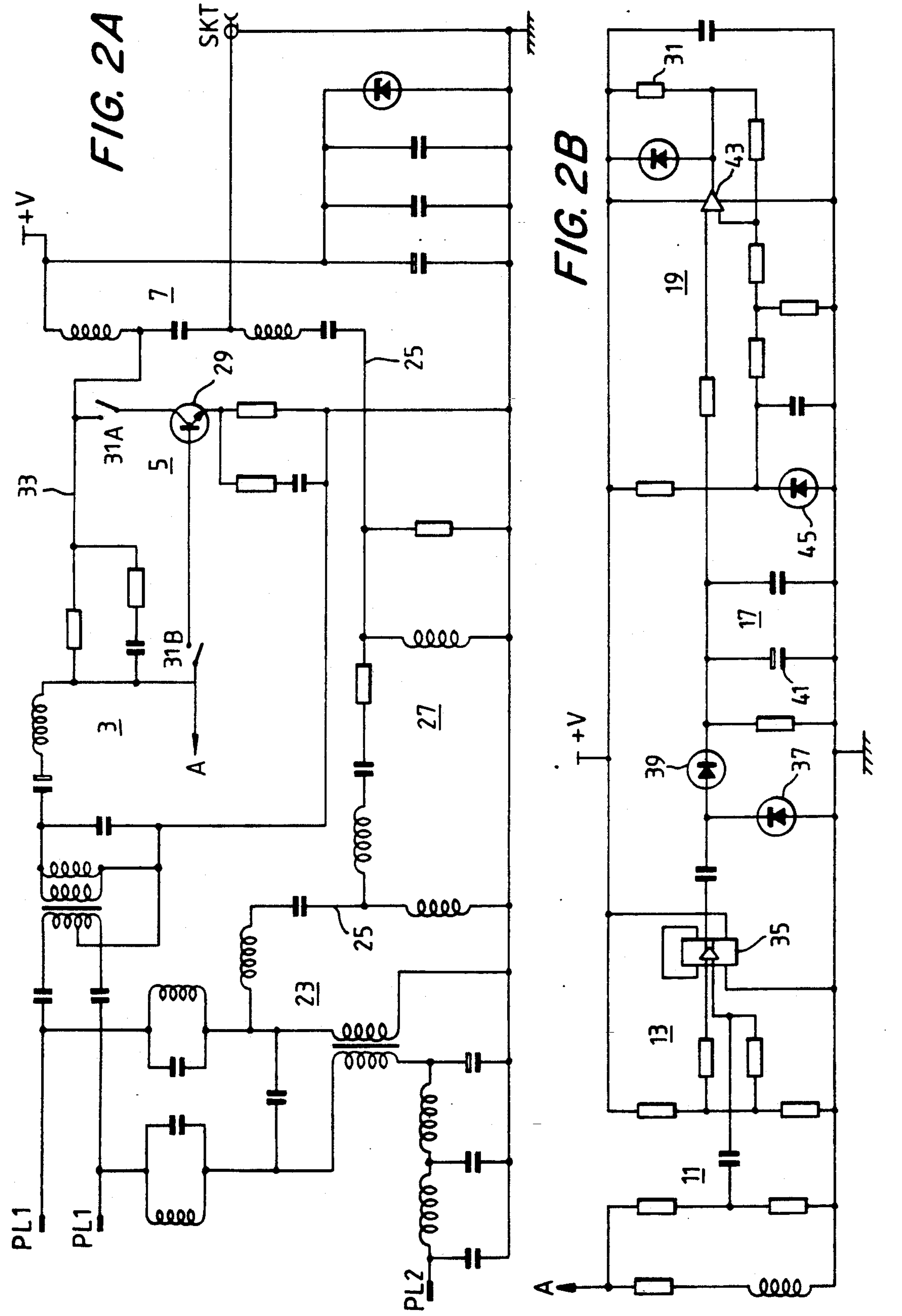
FIG. 2 is a full schematic diagram of one embodiment of the arrangement of FIG. 1.

FIGS. 2A and 2B show one particular embodiment of the arrangement of FIG. 1.

The arrangement of FIGS. 2A and 2B provides both medium wave and VHF r.f. signals for use by a radio receiver (not shown), but incorporates a radio frequency amplifier bypass protection arrangement according to the invention only in respect of VHF signals.

In the arrangement of FIGS. 2A and 2B the vehicle rear window heater/antenna (not shown) is connected between two terminals PL1. The d.c. supply for the heater/antenna is applied between a terminal PL2 and ground, the terminals PL1 being respectively connected to ground and the terminal PL2 via r.f. isolating circuits 23 of known form.

Medium wave band r.f. signals are fed from the heater/antenna via a path 25 to a socket SKT for connection to the antenna terminal (not shown) of the radio receiver, the path 25 being associated with frequency selection and matching circuits 27.

VHF wave band r.f. signals are fed from the heater-/antenna to the socket SKT via r.f. matching circuits 3, r.f. amplifier 5, incorporating transistor 29, and further r.f. matching circuits 7.

The bypass circuit 21 comprises a relay 31 and associated contacts 31A, 31B which, when open, disable the amplifier 5 by removal of the collector supply voltage -for the transistor 29 and disconnection of the base of transistor 29 from the heater/antenna, the amplifier 5 then being bypassed via path 33.

The VHF band signals for operating the bypass circuit 21 are fed to buffer circuit 11 from the path 33. The high gain second r.f. amplifier 13 comprises an integrated circuit 35. The detector 15 comprises diodes 37, 39 and the smooth and hold circuit 17 is constituted by a high valued capacitor 41 and associated components (not referenced).

The trigger circuit 19 comprises an operational amplifier 43 whose output provides the operating current for the relay 31. A reference input for the amplifier 43 is provided by a zener diode 45 and associated components (not referenced).

It will be understood that the invention finds particular application in mobile, e.g. vehicle mounted, radio receiver installations since in such installations the antenna is especially likely to experience very large variations in the intensity of the r.f. field to which it is subjected. However, whilst the antenna arrangement described above, by way of example, makes use of a rear window heater as an antenna, the invention is equally applicable to arrangements using other forms of antenna.

It is pointed out that whilst in the particular radio receiver antenna arrangement described above, by way of example, the bypass circuit 21 is rendered conductive in response to signals derived substantially directly from the antenna, this is not necessarily the case in an arrangement according to the invention. Hence in an alternative arrangement according to the invention the bypass circuit may, for example, be rendered conductive in response to an automatic gain control signal developed in the receiver.

We claim:

1. A radio receiver antenna arrangement, comprising: a radio antenna; a radio frequency amplifier associated with the antenna from amplifying signals picked up by the antenna prior to their application to a radio receiver; and bypass circuit means associated with said amplifier for establishing a bypass path around said amplifier when a signal picked up by said antenna has an amplitude that exceeds a predetermined level; said bypass circuit means including control means responsive the signal picked up by said antenna for disabling said amplifier and establishing said bypass path only when the signal picked up by said antenna has an amplitude that exceeds said predetermined level; said control means including means for producing a d.c. output having a value that varies with the amplitude of the signal picked up by the antenna, trigger circuit means for producing a control output when said d.c. output exceeds a reference value, and a controllable switching device operated by the control output of said trigger circuit means; said means for producing a d.c. output comprising a rectifying detector to which the signal picked up by the antenna is applied by way of a further amplifier, and a hold circuit for smoothing and temporarily holding the d.c. output of the detector.

2. An arrangement according to claim 1 wherein said detector is connected with said antenna by way of a buffer circuit for preventing intermodulation products produced by said further amplifier passing through said bypass circuit means.

3. An arrangement according to claim 1 wherein the receiver is mounted in a mobile radio receiver installation.

* * * * *